United States Patent

[11] 3,551,770

[72] Inventor Wayne R. Isaacs
 Houston, Tex.
[21] Appl. No. 773,398
[22] Filed Nov. 5, 1968
[45] Patented Dec. 29, 1970
[73] Assignee Bausch & Lomb Incorporated
 Rochester, N.Y.
 a corporation of New York

[54] MOTOR DRIVE CIRCUIT
 11 Claims, 5 Drawing Figs.
[52] U.S. Cl. .................................................... 318/597,
 318/28, 318/283
[51] Int. Cl. ................................................... G05f 1/08
[50] Field of Search .......................................... 318/283,
 284, 285, 286, 20.835, 20.500, 20.285

[56] References Cited
UNITED STATES PATENTS

| | | | |
|---|---|---|---|
| 3,296,513 | 1/1967 | Morton ........................ | 318/286X |
| 3,369,160 | 2/1968 | Koppel et al. ................. | 318/28X |
| 3,430,117 | 2/1969 | Sennhenn .................... | 318/28X |

Primary Examiner—Benjamin Dobeck
Attorneys—Frank C. Parker and Charles C. Krawczyk ABSTRACT: A circuit is disclosed for driving a motor with periodic current pulses that vary in duration. A detection circuit monitors the duration of the pulses to determine when the motor is in a slew and/or limit condition. The detection circuit inactivates a portion of the drive circuit when in the limit condition until the input signal reverses the direction of travel.

WAYNE R. ISAACS
INVENTOR.

ATTORNEY

WAYNE R. ISAACS
INVENTOR.

BY
Charles C. Krawczyk
ATTORNEY

WAYNE R. ISAACS
INVENTOR.

3,551,770

MOTOR DRIVE CIRCUIT

CROSS-REFERENCES TO RELATED APPLICATIONS

A copending patent application Ser. No. 772,714, filed Nov. 1, 1968, now Pat. No. 3,524,918 entitled "Motor Drive Circuit With Dischargeable Capacitive Network" including the circuitry disclosed in the present application was filed for the inventor James A. Parnell and is assigned to the assignee of the present application. The copending patent application claims a motor drive circuit including a response shaping network in the forward loop and means for discharging the network in slew and/or limit condition.

BACKGROUND OF THE INVENTION

This invention relates to motor drive circuits in general and more particularly to circuits for determining when a slew condition and travel limits are reached.

In most servo systems it is generally desirable to have as high a frequency response as possible so that the servo system can track a control signal with a minimum amount of dynamic error. In order to achieve this rapid response it is desirable to operate the servo motor at maximum power capacity to achieve maximum torque for acceleration, speed, etc. Furthermore, it is also highly desirable to have the open loop gain of the system as high as possible to reduce errors due to dead band, friction, etc., to an acceptable value. When incorporating such design requirements in a closed loop system, stability becomes a problem, particularly when attempting to achieve an optimum frequency response.

In various servo systems, such as in recorders, etc., the range of travel of the servo system is limited. Accordingly, some provisions must be included in the servo system to allow the servo to slew throughout its range of travel and into the limit position at maximum speed, and then stop and be held in the limit position until a signal is received to reverse the direction of travel. Once in the limit position, it is highly desirable that the system respond immediately to a reverse signal and move away from the limit position with a minimum of time delay.

Some systems of the prior art use clutch or slip mechanisms that keep the motor from overheating when the limit position is reached. The clutch and slip mechanisms undesirably increase the inertia of the system and are subject to wear. Other systems of the prior art operated the motor at a reduced power input so that the motor can be stalled continuously in the energized position without detrimental heating effects. This type of system requires a substantially greater and more expensive motor and sacrifices acceleration capabilities for reduced power operation.

It is therefore an object of this invention to provide a motor drive system including a slew and a limit circuit for determining when the motor is driven to the limit of its travel whereupon power is removed therefrom.

SUMMARY OF THE INVENTION

A slew and/or limit detection circuit is provided for a motor drive circuit including a pair of power control devices for applying variable duration current pulses from an AC source to a motor to drive the motor in opposite directions and a control circuit responsive to a motor drive signal to control the conduction angle of the devices.

The circuit of the invention includes means for measuring the conduction angle of the power control devices to provide control signals when either of the devices exceed a preset conduction angle that terminate when the other device conducts. The preset conduction angle corresponds to the power designated for a motor slew.

A further feature of the invention includes time delay circuit means responsive to the control signals for inactivating the power device whose conduction exceeds the preset conduction angle after a preset time delay. The time delay is sufficient to slew the motor into its limit position. The power device remains cut off until a reverse input signal is received.

DESCRIPTION OF THE PREFERRED EMBODIMENTS

Figure 1:
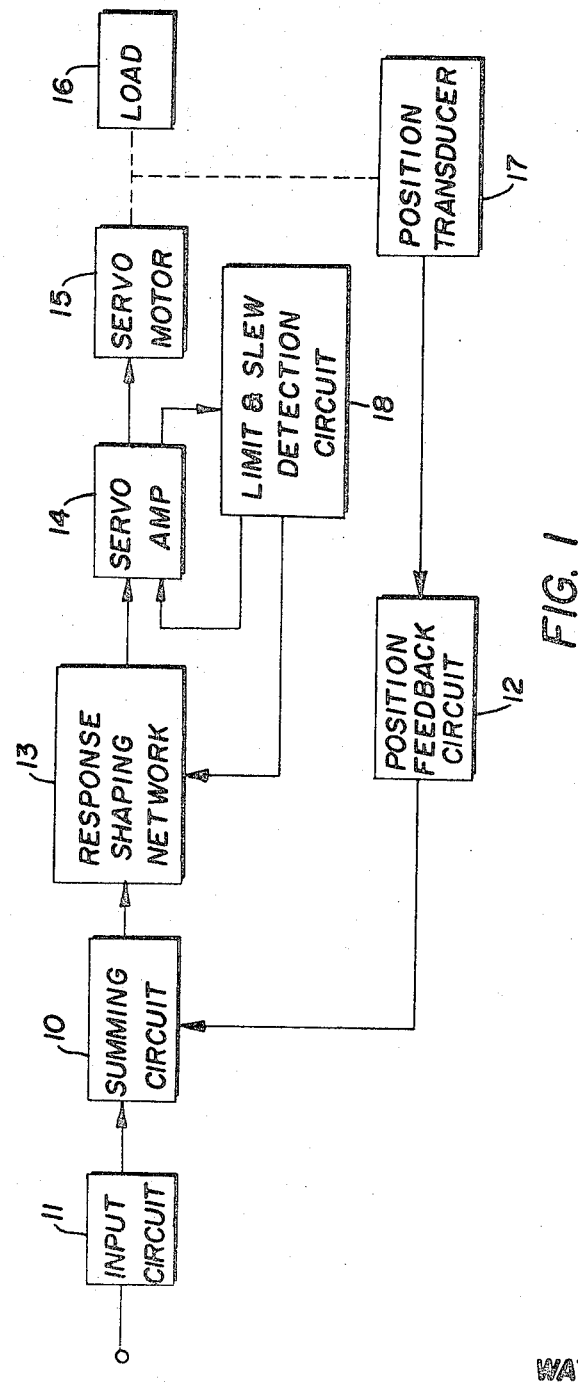
FIG. 1 is a simplified block diagram of a closed loop servo system including the invention.

In the closed loop servo system of FIG. 1, input drive signals are applied to a summing circuit 10 from an input circuit 11. The summing circuit 10 compares the input signal to that from a feedback circuit 12 to apply a difference signal through a response shaping network 13 to a servo amplifier 14. The servo amplifier 14 applies the amplified difference signal to a servo motor 15 which drives a load 16. A position transducer 17, coupled to the motor 15, applies a positioned feedback signal to the feedback circuit 12. The motor 15 is driven until the feedback signal cancels the input signal, resulting in a zero difference signal and a null position.

In the closed loop servo system of FIG. 1, the response shaping network 13 was included in the forward loop of the system, to tailor the forward loop frequency response. This allows the servo loop of the system to be closed at a higher frequency to provide a better responding servo system with a sufficient degree of stability.

Response shaping networks generally comprises resistor capacitor (R-C) circuits that are designed along with the input and output inpedances of the intermediate stages to shape the frequency response of the system. The resistor and capacitor values are generally high and provide a long R-C time constant. This type of circuit functions well except when the servo system becomes saturated by a large input signal. This often occurs when the system receives a slew drive signal, or the load is driven into a limit position. In such cases, the input circuit is generally saturated and the capacitors are charged to abnormal values due to the nonlinear mode of operation. The system cannot be reversed until the capacitor is discharged from this nonlinear condition. Since the R-C time constant is long, this would require either a very large reverse error signal or a long time delay, neither of which is either desirable or satisfactory.

The system of the invention includes a limit and slew detection circuit 18 that monitors the operation of the servo amplifier 14 to determine when a slew and limit conditions has been reached and allows the motor to be driven into the limit positions under full power and then removes the power from the motor until a reverse signal is received.

Figure 2:
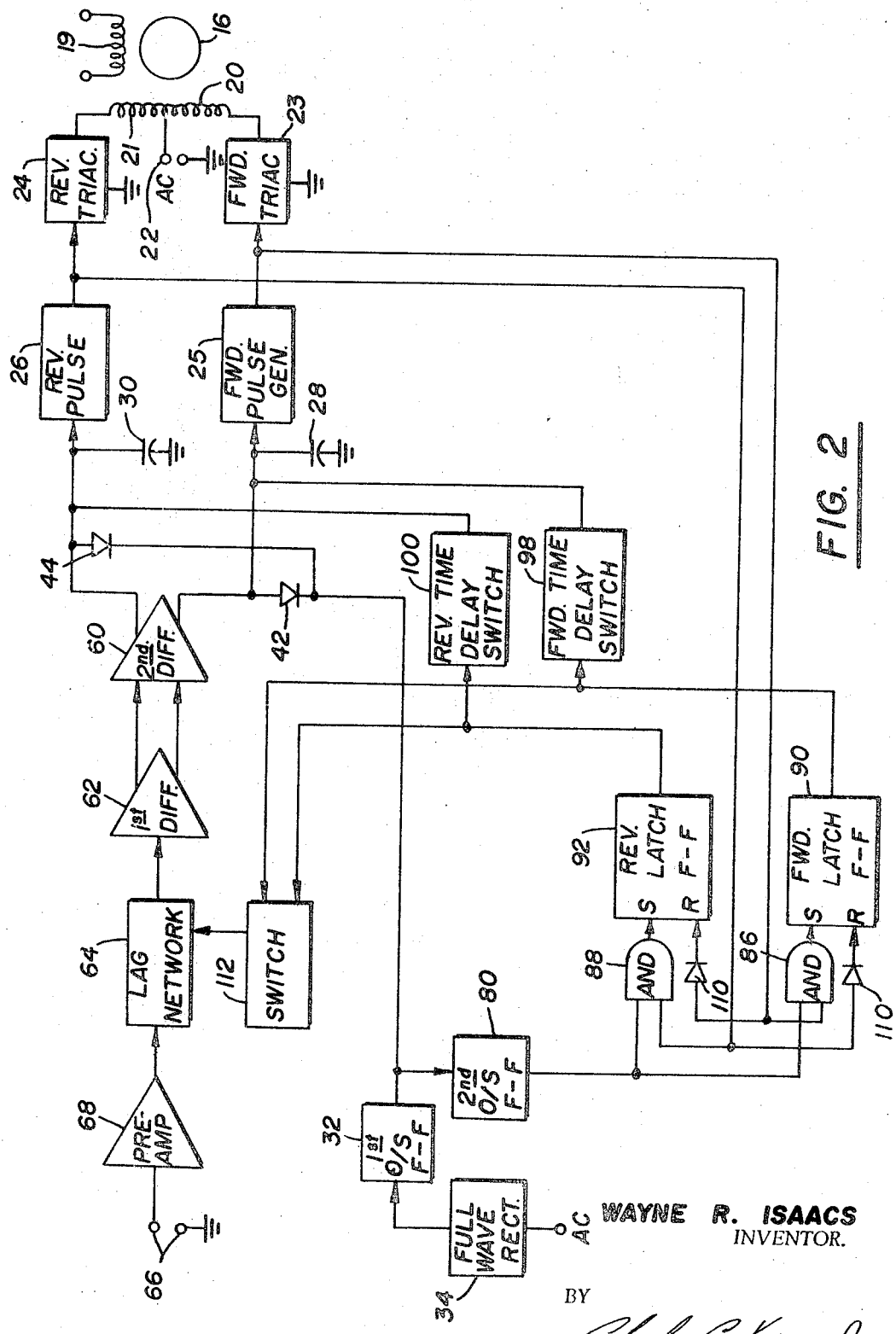
FIG. 2 is a block diagram of a portion of the servo system of FIG. 1 including the invention.

In FIG. 2, a servo motor 16 is illustrated as a split phase AC motor having a field winding 19 energized by an alternating signal 90° out of phase from the signals applied to the motor control windings 20 and 21. An alternating current power source is to be connected between the center tap 22 and ground. A triac 23 (forward drive) and triac 24 (reverse drive) are connected in series with the opposite ends of the control windings 20 and 21, respectively. A triac is a semiconductor bidirectional triode switch that conducts with either polarity of an AC signal applied thereto and requires an input pulse for each polarity or reversal of the AC power source. The triacs 23 and 24 are rendered conductive by control pulses from a forward pulse generator 25 and reverse pulse generator 26, respectively. The pulse generators 25 and 26 generate a control pulse when the connected input capacitors 28 and 30, respectively, are charged to a predetermined voltage level.

The pulse generators are synchronized to the AC voltage by a one-shot monostable flip-flop circuit 32. The input circuit of the flip-flop circuit 32 is connected through a full wave rectifying circuit 34 and receives a series of half wave 120 cycle pulses illustrated by the waveform 36 in FIG. 5. The flip-flop circuit 32 is "set" on the negative going portion of the rectified pulse as designated by the dash line 38 and remains in the "set" condition for a time duration sufficient to extend into a portion of the next following half cycle as illustrated by the waveform 40.

Figure 3:
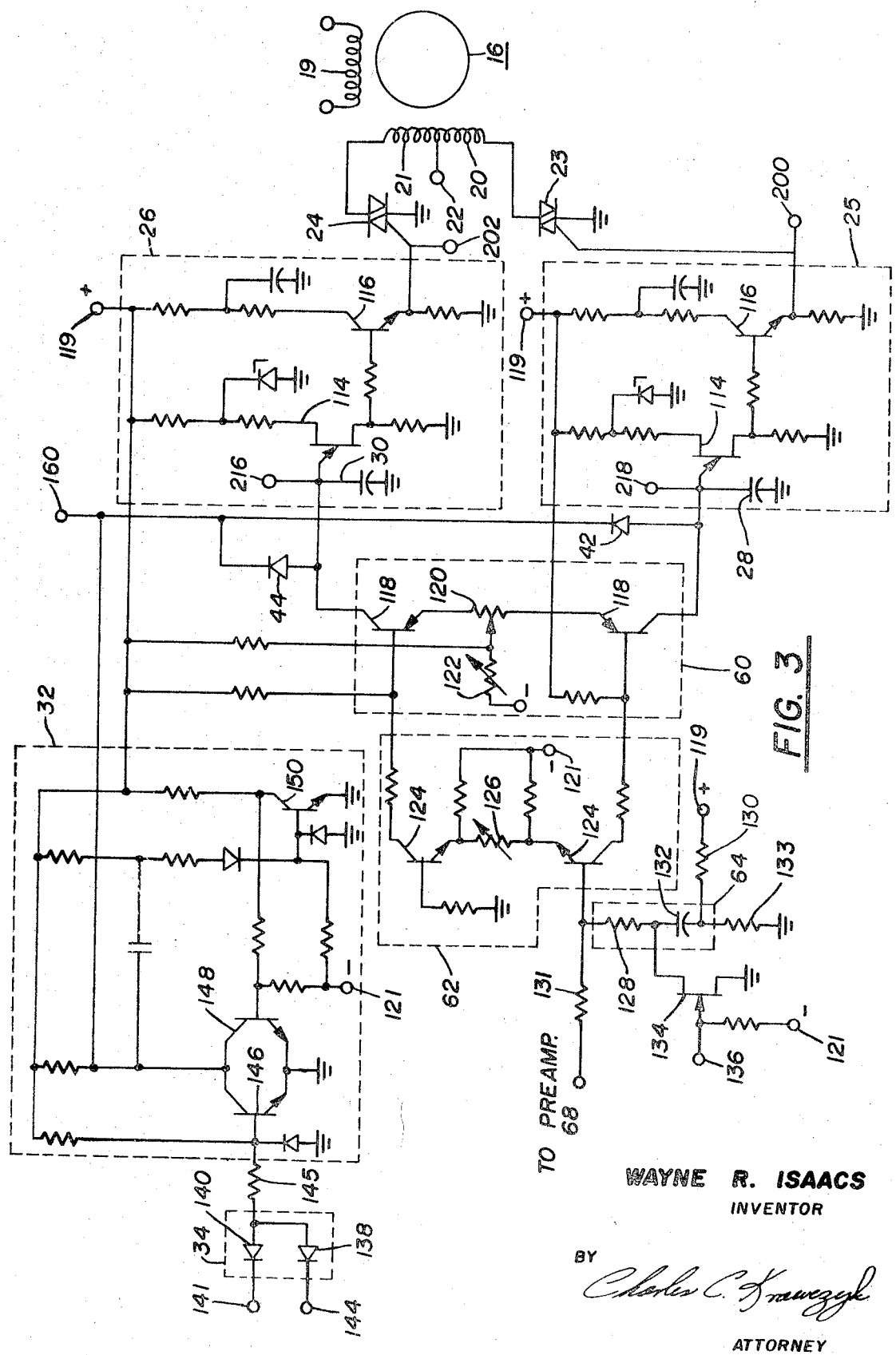
FIG. 3 is a schematic diagram of the drive circuit portion of the block diagram of FIG. 2.

The capacitors 28 and 30 of FIG. 3 receive the square pulses 40 through the diodes 42 and 44 respectively. The capacitor 28 and 30 charge during the "reset" cycle of the flip-flop 32 to produce the sawtooth waveforms 46 and 48 of FIG. 5. When the waveforms 46 and 48 reach a predetermined voltage level 50 and 52, the connected pulse generator generates the pulse signals 54 and 56 respectively, discharge the capacitors 28 and 30 and render the triacs 23 and 24 conductive. This is a null idle type of condition wherein the motor is held stationary. Both triacs are conducting slightly as illustrated by the crosshatched portions 58 of waveform 36 in FIG. 5 to allow current flow simultaneously through both the windings 20 and 21. The currents cancel each other but function as an idling current through the motor to minimize dead band.

The rate at which the capacitors 28 and 30 charge is controlled by a differential amplifier 60. The differential amplifier 60 is driven by a differential amplifier 62 which in turn receives a single ended input signal from a frequency response shaping lag network 64. The input signals to the servo system are applied across the terminals 66 and are amplified by a preamplifier 68 which in turn drives the lag network 64.

When a direct current signal is applied to the terminals 66 the signal is amplified by amplifiers 68 and 62 and produces unbalanced output at the differential amplifier 60. The unbalanced output causes the capacitors 28 and 30 to charge at different rates. For example, if a signal having a polarity to produce forward rotation of the motor 16 is applied to the terminal 66, the capacitor 28 charges at a substantially greater rate than the capacitor 30, as illustrated by the waveforms 70 and 72 of the FIG. 5. It should be noted that the first time the capacitor 28 (waveform 70) is charged to the pulse level, a pulse 76 is generated (waveform 74) and the triac 23 is rendered conductive for the remainder of the half wave. In the particular example the triac 23 is rendered conductive at an angle of 90° of the rectified 60 cycle waveform. The second pulse 78 does not effect the conduction of the triac 23. The capacitor 30 charges at a very slow rate and does not reach the level to cause the pulse generator 26 to produce an output pulse and is discharged each time the flip-flop 32 is "set." When the triac 23 conducts the motor 16 rotates in the forward direction. Although the triac is illustrated to be conductive for an angle of 90°, it is to be understood, however, that the angle at which the triac is rendered conductive is varied depending upon the magnitude of the signal applied to the terminal 66.

Figure 4:
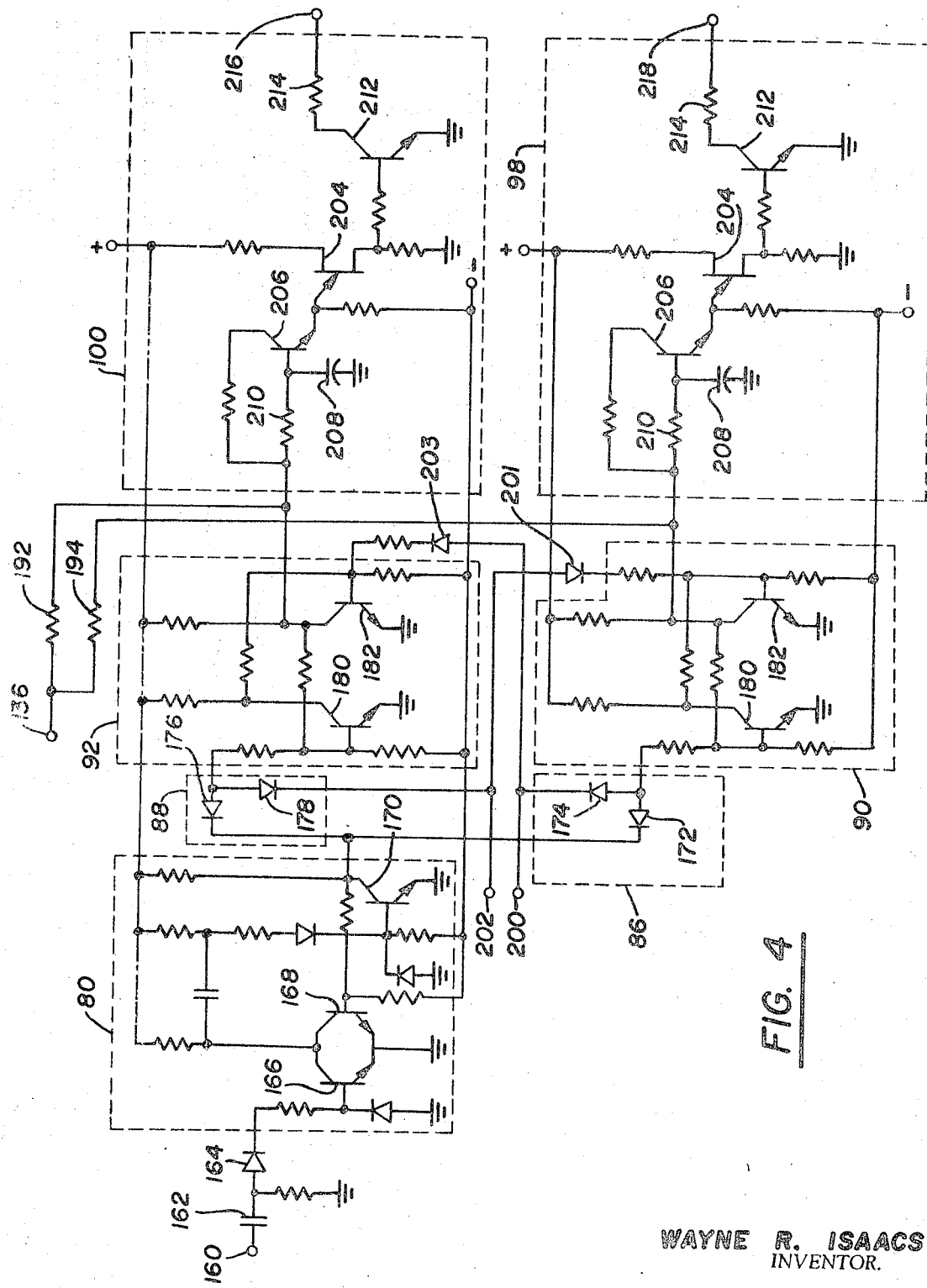
FIG. 4 is a schematic diagram of the limit and slew circuitry portion of the block diagram of FIG. 2.

The limit circuitry functions to cut off the drive signal to the motor after a period of time sufficient to drive the motor into its limit position. A second monostable one-shot flip-flop 80 is coupled to the flip-flop 32 to be "set" when the first flip-flop 32 is "reset." The second flip-flop 80 has a time duration in the "set" position that is substantially shorter than the half cycle and is illustrated in FIG. 4 as the waveform 82. The time duration of the flip-flop 82 is selected so that it is "reset" at a conduction angle corresponding to the slew condition of the motor and also a saturation condition of the preamplifier 68, as designated by the dashed line 84.

The output from flip-flop 80 is connected to an input circuit of a pair of AND gate circuits 86 and 88. The other input circuits of the AND gate circuits 86 and 88 are connected to receive pulses from the pulse generators 25 and 26 respectively. The output from the AND gate 86 is connected to the "set" terminal of the forward "latch" flip-flop 90 while the output terminal of the AND gate 88 is connected to "set" terminal of the reverse "latch" flip-flop 92. The "reset" terminals of flip-flops 90 and 92 are connected via diodes 110 to pulse generators 25 and 26 respectively. The output circuits of the flip-flops 90 and 92 are connected to the time delay switches 98 and 100. The time delay switches, when their time delay has run, are connected to short the capacitors 28 and 30. This cuts off any drive signal to the motor 16.

When the second flip-flop 80 is in the "set" condition, the occurrence of a pulse from the connector pulse generator enables the AND gate and "sets" the connected latch flip-flop. This condition is only possible when the amplifier 68 is saturated and the motor 16 is in the slew or limit condition. This condition is illustrated by the dashed line 94 in FIG. 5 extending between the pulse 76 (waveform 74) and the "set" condition of flip-flop 80 (waveform 82). When either flip-flop 90 or 92 are "set" the connected time delay switch 98 or 100 respectively begins to time.

Figure 5:
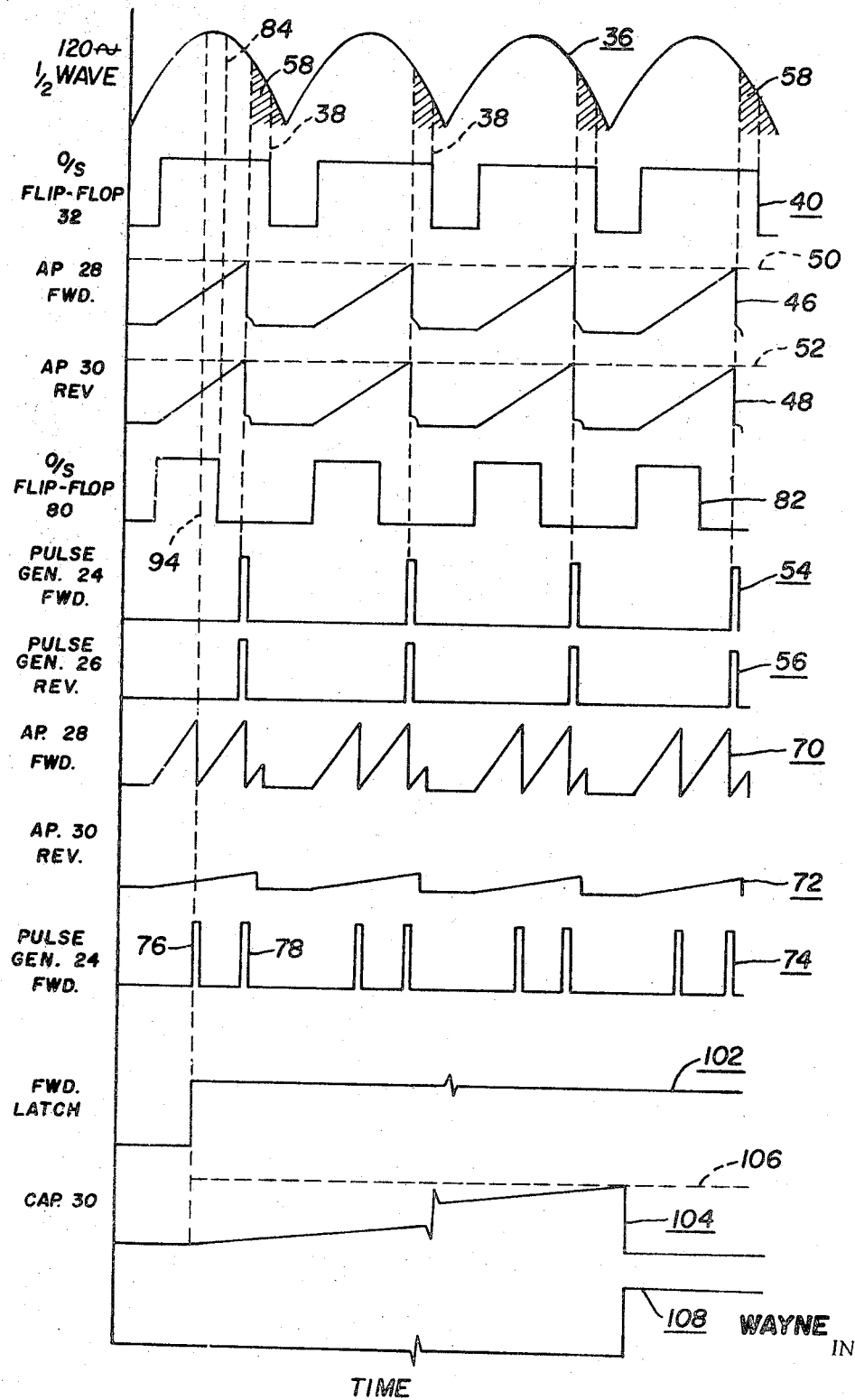
FIG. 5 is a graphic plot of the waveforms of the systems of FIGS. 1—4 to illustrate the operation of the system of FIGS. 1—4.

The curve 102 in FIG. 5 illustrates the latching action of the flip-flop 90. A ramp signal is generated by the time delay switch 98 as illustrated by the curve 104. When the ramp reaches a predetermined level 106 the time delay switch is actuated as illustrated by the curve 108, to discharge the capacitor 28 and maintain the capacitor discharged and the power to the motor cut off. The time duration of the delay switch 98 and 100 is selected to be more than sufficient to drive the motor into the limit position. The time delay begins to run when the motor has reached the slew conditions or the motor has traveled to the limit condition and the error signal becomes large enough to apply full power to the motor.

Without the limit and slew detection circuit, a capacitor component in the lag network 64 would become charged to a high value when the preamplifier 68 becomes saturated. If a change of direction signal is applied to the terminal 66, the motor 16 would receive an input signal with a significant offset signal until the capacitor in the network was sufficiently discharged. This causes an undesirable time delay when changing directions after a saturated condition. A switching circuit 112 is connected to the lag network 64 to discharge the capacitive circuit when the preamplifier 68 reaches the saturated condition. The switching circuit 112 is connected to be actuated when either of the latch flip-flops 90 or 92 are "set."

FIGS. 3 and 4 are detailed schematic diagrams illustrating components within the blocks of FIG. 2. The blocks in FIG. 2 are designated in FIGS. 3 and 4 by dashed lines identified with the same reference numerals. The pulse generator circuits 25 and 26 include a unijunction transitor 114 connected as a relaxation oscillator time delay circuit to produce an output pulse when the connected capacitor reaches a preset level. The output pulse from the unijunction transistor 114 is coupled to the triacs 23 and 24 through a transistor 116 connected in an emitter follower circuit.

The differential amplifier 60 includes a pair of transistors 118, a balance potentiometer 120 and a motor current adjusting potentiometer 122. The potentiometer 120 is set to balance the operation of the servo system to a null condition. The potentiometer 122 is used to control the idle current flow through the motor in the null condition. The transistors 118 receive a double ended or balanced signal from the differential amplifier 62.

The differential amplifier 62 includes a pair of transistors 124 and potentiometer 126 that functions as a gain control. The differential amplifier 62 has a nonlinear gain characteristic that somewhat compensates for the nonlinear gain characteristics of the current versus conduction angle of the triacs to provide a more linear operation.

The input to the differential amplifier 62 is single ended and is developed across the lag network 64. The lag network includes two resistors 133 and 128 and a capacitor 132 connected in a series. Input signals from the preamplifier 68 are applied through the resistor 131 to the amplifier 62. A field effect transistor 134 is connected across the capacitor 132 and the resistor 133 (as the switch 112, FIG. 2) for shorting the voltage across the capacitor to ground when receiving a switching signal on the terminal lag Resistor 130 is connected between a source of direct current potential 119 and the junction of capacitor 132 and resistor 133. It prevents capacitor 132 from being charged to excessive levels between successive switching signals.

The full wave rectifier circuit 34 includes a pair of diodes 138 and 140 for full wave rectifying the voltage applied to the terminals 141 and 144. The 120 cycle signal from the diodes is coupled to the one-shot flip-flop 32, through a current limiting resistor 145, which includes the transistors 146, 148 and 150. The output from the one-shot flip-flop 32 is coupled through the diodes 42 and 44 to the bases of unijunction transistors 114 and the collectors of the transistors 118. The one-shot flip-flop 32, the amplifier 62, and the pulse generating circuits 25 and 26 are conventionally energized by a direct current potential applied to the connected terminals 119 and 121 with the designated polarity.

As previously mentioned, the one-shot flip-flop 32 produces a 120 cycle square wave as illustrated by the waveform 40. The capacitors 28 and 30 are charged during the "reset" portion of the cycle as illustrated by the curves 46 and 48. When the unijunctions 114 fire they discharge the connected capacitor and generate the pulses illustrated by the curves 54, 56, and 74 to fire the connected triacs, 23 and 24.

In FIG. 4, the output from the one-shot flip-flop 32 is applied to the terminal 160 and coupled through a capacitor 162 and a diode 164 to "set" the flip-flop 80. The flip-flop 80 includes the transistors 166, 168, and 170 connected as a monostable flip-flop circuit.

The diodes 172 and 174 form the AND gate 86 while the diodes 176 and 178 form the AND gate 88. The output from the flip-flop 80 is applied to the diodes 172 and 176. The latch flip-flops 90 and 92 include a pair of transistors 180 and 182 connected as bistable flip-flop circuits. The outputs from the flip-flops 90 and 92 are connected to the terminal 136 through the resistors 192 and 194. The terminal 136 (FIG. 3) is connected to the switching field effect transistor 134. When either of the flip-flops 190 or 192 are "set," a switch signal is applied to the terminal 136 to discharge the capacitor 132. This condition occurs when the servo system in the slew condition and/or limit condition.

The pulses from the forward generator 25 are applied to a terminal 200 while the pulses from the reverse pulse generator 26 are applied to the terminal 202. Pulses on the terminals 200 and 202 are applied through the diodes 203 and 201 to reset the flip-flops 92 and 90 respectively and also to the AND gates diodes 178 and 174.

The time delay switch circuits 98 and 100 include a unijunction transistor 204 driven by an emitter follower transistor 206. When the connected flip-flop is "set" an energizing potential is applied to the transistor 206 at the same time the capacitor 208 is charged. The R-C time constant of the resistor 210 and the capacitor 208 is sufficient to provide the required time delay, which can be, for example, one second. When the voltage occurs across the capacitor 208 reaches the predetermined level 106 (FIG. 5) the unijunction 204 is rendered conductive and saturates the connected transistor 212.

The transistor 212 is connected through the resistor 214 to a terminal 216, or 218, which in FIG. 2 are connected to the capacitors 28 and 30. When a unijunction 204 is rendered conductive, the transistor 212 effectively shorts the connected capacitor in the pulse generating circuit and cuts off the drive signal to the motor. The unijunction transistor 204 remains in the conductive state since it is driven by a low impedance emitter follower transistor 206 until the connected flip-flop circuit is reset. The connected flip-flop is "reset" by a reverse signal applied to one of the terminals 200 and 202.

According to the foregoing, the limit delay switches 98 and 100 begin to time as soon as the motor 16 receives sufficient power to designate a slew or limit condition. The slew condition is determined if a pulse from either of the pulse generators 25 and 26 occurs during the time the second one-shot flip-flop 80 is "set." At this time, the corresponding latch flip-flop 90 or 92 is "set" and the connected time delay switch 98 or 100 begins to run. If a reverse signal is received before the time on the time delay switch has run, the circuits are all reset to a normal operating mode. On the other hand, if the time delay switch has run through its delay period, the motor is now in the limit condition and the power is removed from the drive circuit. Hence, in one mode of operation, the time delay switch begins to run when a slew signal is first applied to the motor.

On the other hand, if the motor 16 is slowly driven to its limit of travel, the time delay switch will not run until the input signal is of sufficient amplitude so that the timing of the driving signal (from pulse generator 25 or 26) with reference to the operation of flip-flop 88 corresponds to the slew condition. At this time, the flip-flop 90 or 92 will be latched and the time delay of the switches 98 and 100 begins to run. Hence, in this mode of operation the power will be cut off when the motor has reached its limit position and the input signal is of sufficient amplitude to correspond to the power for slew.

In either mode of operation, the point at which the slew power condition is preset is determined by the power capabilities of the motor. The gain of the preamplifier can now be selected so that when the slew condition is achieved (maximum desirable motor velocity and/or acceleration) the preamplifier 68 approaches a saturated condition thereby using the full capabilities of the preamplifier. The switch 112 for the lag network 64 minimizes problems in the system due to saturation as previously set forth.

I claim:

1. A motor drive circuit comprising:
   a motor;
   a pair of terminals for connection to an AC power source;
   first and second control devices connected to said motor and said AC power source for driving said motor in opposite directions with variable duration current pulses at a rate synchronized to said AC power source;
   an input circuit for receiving a direct current motor control signal;
   a control circuit coupled between said input circuit and said first and second control devices and synchronized to said power source for increasing the duration of the pulses from said first device when the control signal changes in a first direction from a reference level and increases the duration of pulses from said second device when the signal changes in an opposite direction from said reference level;
   circuit means for determining the duration of said of said current pulses from said first control device for generating a first switching signal when the pulses exceed a predetermined duration said first switching signal terminating when said second control device conducts;
   circuit means for determining the duration of said unidirectional current pulses from said second control device for generating a second control signal when the pulses exceed a predetermined duration, said second switching signal terminating when said first control device conducts; and
   time delay circuit means for receiving said first and second switching signals coupled to said control circuit for inactivating said first control device after said first switching signal exceeds a preset time duration and inactivating said second control device after said second switching signal exceeds said preset time duration.

2. A motor drive circuit comprising:
   input circuit means for receiving a direct current control signal;
   a motor;
   a pair of terminals for connection to an AC power source;
   first and second power control means connected between said pair of terminals and said motor for applying variable duration current pulses from said source to said motor so that said first and second power control means drive said motor in opposite directions;
   first control circuit means connected to said first power control means and said input circuit means for controlling the duration of said current pulses as a function of the sense and magnitude of said direct current input signal relative to a reference potential to drive the motor in a first direction;

second control circuit means connected to said second power control circuit means and said input circuit means for controlling the duration of said current pulses as a function of the sense and magnitude of said direct current input signal relative to said reference potential to drive the motor in a second direction opposite said first direction;

a first detection circuit coupled to said first power control means for providing a first switching signal when the time duration of said variable duration current pulses exceeds a preset time duration which corresponds to the power required for said motor to slew;

a second detection circuit coupled to said second power control means for providing a second switching signal when the time duration of said variable duration current pulses exceeds said preset time duration;

a first time delay circuit coupled between said first detection circuit and said first control circuit means for inactivating said first control circuit means in response to said first switching signal after a preset time delay; and a second time delay circuit coupled between said second detection circuit and said second control circuit means for inactivating said second control means in response to said second switching signal after said preset time delay.

3. In a motor drive circuit including first and second power devices for applying variable duration rectified AC pulses to a motor from an AC power source for driving said motor in opposite directions and a control circuit responsive to a motor control signal for controlling conduction of said power devices and the duration of said pulses as a function of the amplitude and sense of said motor control signal, the improvement comprising:

first circuit means synchronized to said AC power source for providing at least one reference signal for each cycle and having a preset time duration shorter than the period of a cycle;

first and second bistable switching circuits having first and second stable modes of operation;

second circuit means coupled to said first and second bistable switching circuits for switching said first switching circuit into its first mode of operation when said second power device is rendered conductive and for switching said second switching circuit into its first mode of operation when said first power device is rendered conductive;

third circuit means coupled to said first switching circuit for switching said first switching circuit into its second mode of operation when said first power device is conductive during said reference signal indicating sufficient power for motor slew in a first direction;

fourth circuit means coupled to said second switching circuit for switching said second switching circuit into its second mode of operation when said second power device is conductive during said reference signal indicating sufficient power for motor slew in a second direction;

a first delay circuit coupled between said first switching circuit and said control circuit for inactivating said first power device a preset time delay after said first switching circuit is switched into its second mode of operation; and a second delay circuit coupled between said second switching circuit and said control circuit for inactivating said second power device a preset time delay after said second switching circuit is switched into its second mode of operation.

4. The improvement as defined in claim 3 wherein said first circuit means provides a reference signal for each half cycle of said AC power source signal, said reference signals having a time duration of less than a half cycle.

5. In a motor drive circuit including first and second power control means for applying variable duration rectified AC pulses from an AC power source for driving a motor in opposite directions and a control circuit responsive to a motor control signal for controlling the conduction of said power control means and the duration of said pulses as a function of the amplitude and sense of said motor control signal, the improvement comprising:

first circuit means coupled to said first and second power control means for measuring the conduction angle of said first power control means and for providing a first continuous control signal when a preset conduction angle is exceeded until said second power control means conducts;

second circuit means coupled to said first and second power control means for measuring the conduction angle of said second power control means and for providing a second continuous control signal when a preset conduction angle is exceeded until said first power control means conducts;

first time delay circuit means coupled between said first circuit means and said control circuit for preventing said first power control means from further conduction if the duration of said first control signal exceeds a preset time delay; and second time delay circuit means coupled between said second circuit means and said control circuit for preventing said second power control means from further conduction if the duration of said second control signal exceeds said preset time delay.

6. In a motor drive circuit including first and second power control means for applying variable duration rectified AC pulses from an AC power source for driving a motor in opposite directions along a path having two limits of travel and a control circuit responsive to the amplitude and sense of a motor control signal for inversely controlling the conduction angle of said first and second power control means, the improvement comprising:

first circuit means synchronized to said AC power source for providing at least one reference signal for each cycle having a first preset time duration shorter than the period of a cycle defining a preset conduction angle corresponding to power for motor slew;

second circuit means coupled to said first and second power control means and said first circuit means for comparing the conduction angle of said first power control signal when the conduction angle of said first power control means exceeds said preset conduction angle which first control signal is terminated by the conduction of said second power control means;

third circuit means coupled to said first and second power control means and said first circuit means for comparing the conduction angle of said second power control means with said reference signal to provide a second control signal when the conduction angle exceeds said preset conduction angle which second control signal is terminated by the conduction of said first power control means; and time delay circuit means coupled between said second and third circuit means and said control circuit for inactivating said first power control means in response to said first control signal exceeding a second preset time duration and for inactivating said second power control means in response to said second control signal exceeding said second preset time duration.

7. The improvement as defined in claim 6 wherein:

said second circuit means includes a bistable circuit that is switched into a first mode of operation to generate said first control signal when said first power control means conducts during the presence of said reference signal and is switched into a second mode of operation when said second power control means conducts; and said third circuit means includes a bistable circuit that is switched into a first mode of operation to generate said second control signal when said second power control means conducts during the presence of said reference signal and is switched into a second mode of operation when first power control means conducts.

8. The improvement as defined in claim 7 wherein said first circuit means provides a reference signal for each half cycle of said AC power initiated at approximately the beginning of each half cycle and extending for a time duration less than a half cycle.

9. The improvement as defined in claim 8 wherein said second preset time duration corresponds to more than the time required to slew the motor from one limit position to the other limit position.

10. A limit circuit for a motor drive circuit comprising:
a load movable along a path having two limits of travel;
a motor coupled to drive said load;
first and second control devices each having first and second terminals exhibiting a controllable current path therebetween and a control terminal for rendering each of said devices conductive;
a pair of terminals for connection to a source of alternating current power;
first circuit means connecting said first and second terminals of said first and second devices between said pair of terminals and said motor for driving said motor in opposite directions;
an input circuit for receiving a motor control signal;
a first control circuit coupled to said pair of terminals and said control terminal of said first device for applying said motor control signal thereto synchronized to said source for controlling the conduction angle of said device;
a second control circuit coupled to said pair of terminals and said control terminal of said second device for applying said motor control signal thereto synchronized to said source for controlling the conduction angle of said device;
second circuit means connecting said input circuit to said first and second control circuits for increasing the conduction angle of said first device and decreasing the conduction angle of said second device when said input signal changes in a first direction with respect to a reference potential and for decreasing the conduction angle of said first device and increasing the conduction angle of said second device when the input signal changes in a second direction;
third circuit means coupled to said pair of terminals for providing at least one reference signal for each cycle of said source voltage and having a preset time duration substantially less than the period of a cycle;
first and second bistable switching means, each having first and second stable modes of operation;
fourth circuit means connecting said first and second bistable switching means to said first and second control circuits, respectively, for switching said first and second switching means into said first mode of operation by said control signals;
fifth circuit means coupling said first bistable switching means to said first control circuit and said third circuit means for switching said first bistable switching means into said second mode of operation when said control signal is generated during the occurrence of said reference signal;
sixth circuit means coupling said second bistable switching means to said second control circuit and said third circuit means for switching said second bistable switching means into said second mode of operation when said control signal is generated during the occurrence of said reference signal;
a first delay circuit coupled between said first bistable switching circuit and said first control circuit for inactivating said first control circuit a preset time duration after said first bistable switching circuit is switched into said second mode of operation; and
a second delay circuit coupled between said first bistable switching circuit and said first control circuit for inactivating said first control circuit a preset time duration after said second bistable switching circuit is switched into said second mode of operation.

11. A motor drive circuit as defined in claim 10 wherein:
each of said first and second control circuits includes a capacitive charging circuit that is charged and discharged each half cycle of the alternating current source signal, wherein said control circuits produce said control signal when said capacitive charging circuit reaches a preset level;
said second circuit means changes the charging rate on said capacitive charging circuit in opposite directions in said first and second control circuits as a function of the magnitude and sense of said motor control signal; and
said first and second delay circuits are coupled to the capacitive charging circuits of said first and second control circuits respectively, so that after said preset time delay of said delay circuits occurs, the connected charging circuit is prevented from reaching said preset level.

UNITED STATES PATENT OFFICE
CERTIFICATE OF CORRECTION

Patent No. 3,551,770   Dated December 29, 1970

Inventor(s)  Wayne R. Isaacs

It is certified that error appears in the above-identified patent and that said Letters Patent are hereby corrected as shown below:

Col. 4, line 73, change "lag" to -- 136.--;
Col. 8, line 44, after "control" insert -- means with said reference signal to provide a first control Signed and sealed this 25th day of May 1971.

(SEAL)
Attest:

EDWARD M. FLETCHER, JR.
Attesting Officer

WILLIAM E. SCHUYLER, JR
Commissioner of Patents